US010200163B1

(12) United States Patent
Yoshioka et al.

(10) Patent No.: US 10,200,163 B1
(45) Date of Patent: Feb. 5, 2019

(54) SMALL AND SEAMLESS CARRIER DETECTOR

(71) Applicant: Texas Instruments Incorporated, Dallas, TX (US)

(72) Inventors: Masahiro Yoshioka, Allen, TX (US); Michael Snedeker, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/794,933

(22) Filed: Oct. 26, 2017

Related U.S. Application Data

(60) Provisional application No. 62/548,963, filed on Aug. 22, 2017.

(51) Int. Cl.
*H04L 1/20* (2006.01)
*H04L 27/14* (2006.01)

(52) U.S. Cl.
CPC ............. *H04L 1/206* (2013.01); *H04L 27/14* (2013.01)

(58) Field of Classification Search
CPC .......... H04L 1/206; H04L 27/14; H04L 27/00
See application file for complete search history.

(56) References Cited

U.S. PATENT DOCUMENTS

| 4,689,801 | A | 8/1987 | Nurczyk et al. |
| 5,461,645 | A | 10/1995 | Ishii |
| 5,815,534 | A * | 9/1998 | Glass ............... H04N 1/327 358/443 |
| 9,363,119 | B1 * | 6/2016 | Gudi ............... H04L 27/1563 |
| 2014/0140445 | A1 * | 5/2014 | Singh ............... H04L 27/14 375/328 |
| 2015/0030089 | A1 * | 1/2015 | Alley ............... H04B 3/54 375/258 |
| 2017/0201401 | A1 * | 7/2017 | Lovell ............... H04L 27/1563 |

FOREIGN PATENT DOCUMENTS

| JP | 111325830 | 11/1999 |
| JP | 2008010928 | 1/2008 |

OTHER PUBLICATIONS

International Search Report in corresponding PCT Application No. PCT/US2018/047110, dated Jan. 7, 2019 (2 pages).

* cited by examiner

*Primary Examiner* — Vineeta S Panwalkar
(74) *Attorney, Agent, or Firm* — John R. Pessetto; Charles A. Brill; Frank D. Cimino

(57) ABSTRACT

In a carrier detector, the simple latch is replaced with a pulse timer and reference control module which outputs logic high (H) when more than two consecutive toggled signals come within 1.5 baud periods and keeps logic high (H) until it misses a toggled signal for two baud periods. This carrier detector has a tolerance for a false detection which happens when the frequency shifts from lower to higher and the input amplitude level does not reach a detectable level. With this transition, the amplitude level at filter output becomes higher due to the transient response of the filter and eventually this would trigger the comparator for only one baud period. The deglitch circuit, however, ignores this clock edge in the carrier detector as provided herein.

15 Claims, 4 Drawing Sheets

SMALL AND SEAMLESS CARRIER DETECTOR

CROSS-REFERENCE TO RELATED APPLICATION

The present application claims priority to U.S. Provisional Patent Application No. 62/548,963 filed on Aug. 22, 2017, entitled "Small and Seamless Carrier Detector for Signal," the entire disclosure of which is incorporated by reference herein.

BACKGROUND

Traditional carrier detection methods are generally based on standard energy detection or RMS detection, and require Hi-Q filters, rectifiers, and converters, all of which lead to high power dissipation and a large implementation area, neither of which is desirable.

There is another approach in the prior art, derived from amplitude monitoring techniques involving a simple comparator or a peak detector. FIG. 1 shows a conventional, prior art carrier detector based on amplitude detection. A signal 105 passes through a front filter 102, and the filter output 107 is passed into a comparator 110 having a comparator reference 112. The comparator output 114 is passed to pulse generator 115, then to a latch 117 for a certain period, then finally the signal is output at CD_OUT 120. Pulse generator 115 serves to extend the length of a pulse to enable sufficient time for deglitch module to act.

This architecture is simple, but weak against a transient response of the front filter 102. If the signal 105 is modulated by frequency-shift keying (FSK), the frequency of the carrier changes among multiple frequencies following the data. This generates a discontinuous derivative at the data transition, which causes a fluctuation of the amplitude level at front filter output 107. This fluctuation level depends on the transfer function of the filter 102, which, in the prior art, generally needs a large guard band for amplitude threshold between "detected" and "rejected" amplitudes to compensate for the fluctuation of the amplitude level with various types of filter, reducing the useful amplitude range. For systems with use for applications such as factory automation, the Highway Addressable Remote Transducer (HART) protocol takes direct current (dc) signals and modulates them according to frequency shift keying (FSK) methodologies to permit communication on a do line. The HART Communication Protocol is a hybrid analog/digital industrial automation protocol which has been developed that is extremely useful in overlaying intelligence on otherwise dumb devices. A most notable advantage of the HART protocol lies in permitting communication over legacy 4-20 mA analog instrumentation current loops and sharing pairs of wires used by analog-only host systems.

According to HART, a digital signal may be made up of two frequencies, 1200 Hz and 2200 Hz representing bits 1 and 0, respectively. Digital words can be transmitted by modulating, for instance, digital ones according to a sinusoid at a first frequency, 1200 Hz ("Mark") and digital zeros according to a sinusoid at a second frequency, 2200 Hz ("Space"). Data transitions, particularly representative of a logic low ("0"), e.g., 2200 Hz ("Space") transitioning to a logic high ("1"), e.g., 1200 Hz ("Mark"), result in a front filter output of decreased amplitude due to the transfer function of the filter as filter gain is a function of frequency. This decreased amplitude may result in comparator 110 not properly detecting a carrier. A similar, yet, less severe problem may occur for transitions from logic high (1200 Hz, "Mark") to logic low (2200 Hz—"Space"). In this instance, transient effects may cause the front filter output that is actually higher than an expected threshold level.

FIG. 1A illustrates a timing diagram for the carrier detector of FIG. 1. FIG. 1 illustrates a representative data sequence of logic lows ("0 s") and logic highs ("1 s"); the frequency shift modulated representation of logic low (2200 Hz—"Space") and logic high (1200 Hz—"Mark"); a representative filter output of filter 102; and the carrier detector output. Comparator 110 may have trouble detecting data transitions from logic low to logic high, due to low amplitude level output reflected by the front filter transient response during such transitions in connection with a modulation change to the input of filter 102 of, for instance, 2200 Hz transitioning to 1200 Hz. This difficulty is reflected by the circled pulses showing missed carrier detections.

In setting up a system that will properly detect signals in connection with, for example, a HART protocol system, a series of ones, low frequency transmissions are sent to adjust the carrier detect threshold level. Nevertheless, the system may be improperly responsive to spurious signals and noise based on the amplitude level for detection needed for those low frequency signals during carrier detector set-up.

Based on the foregoing, there is a need in the art for a small digital circuit and feedback architecture to establish a small and seamless carrier detector, to reduce fluctuation of the amplitude level at the front filter output.

SUMMARY

A carrier detector is provided having a filter with a signal input and a filter output; a comparator having a first input and a second input, the first input of the comparator connected to the output of the filter, and a pulse timer and reference control module having an input and an output, the pulse timer and reference control module input being coupled to the output of the comparator, said pulse timer and reference control module including an edge detector, a timer, and a finite state machine; the pulse timer and reference control module output being connected to the second input of the comparator.

The foregoing, and other features and advantages of the invention, will be apparent from the following, more particular description of the embodiments of the invention, the accompanying drawings, and the claims.

BRIEF DESCRIPTION OF THE DRAWINGS

For a more complete understanding of the present invention, the objects and advantages thereof; reference is now made to the ensuing descriptions taken in connection with the accompanying drawings briefly described as follows.

DETAILED DESCRIPTION OF EMBODIMENTS

Figure 1:
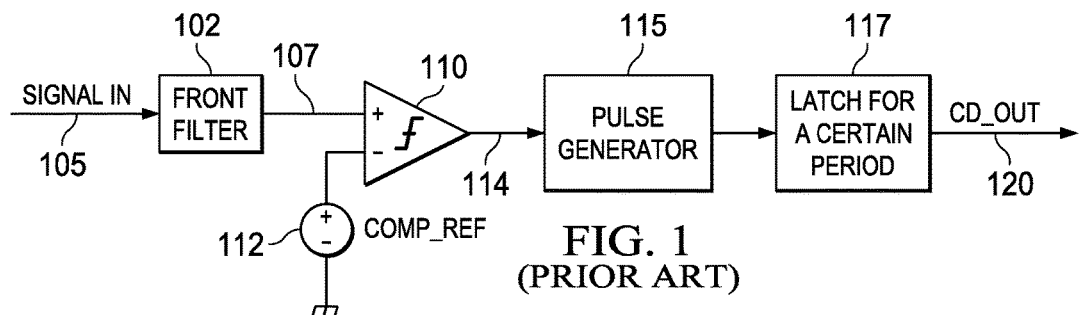
FIG. 1 is a view of a conventional carrier detector in the prior art, based on amplitude detection.
Figure 1A:
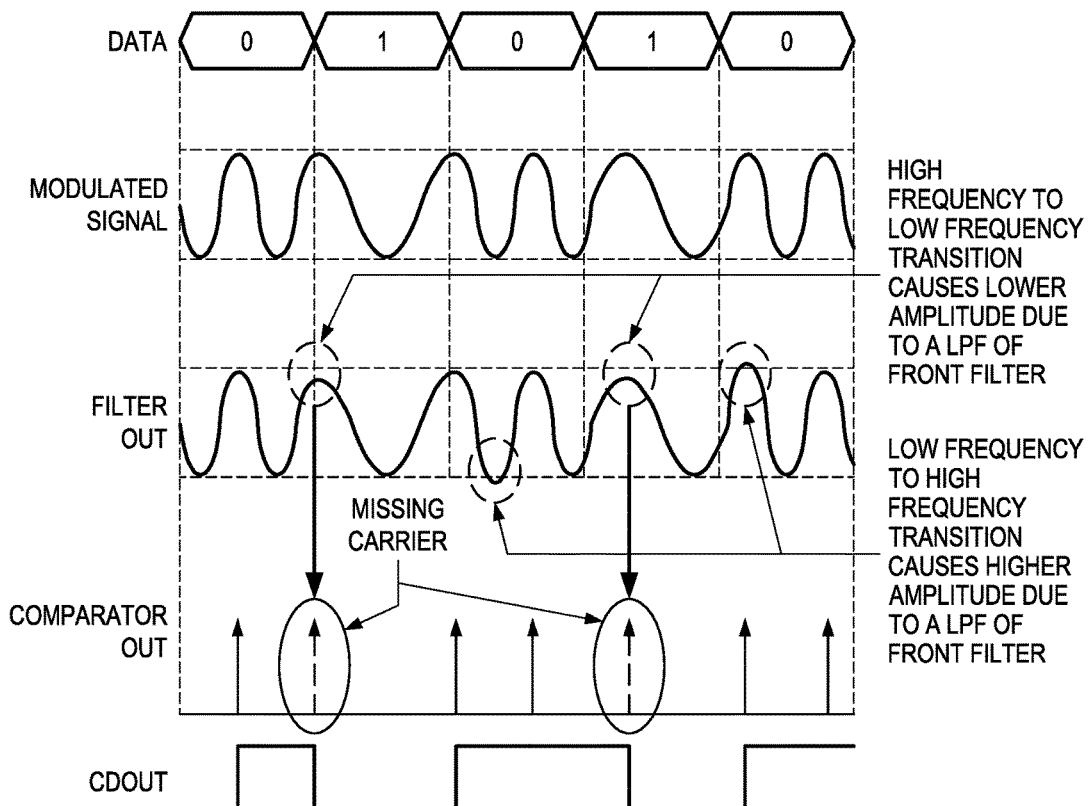
FIG. 1A illustrates a timing diagram for the carrier detector of FIG. 1

Embodiments of the present disclosure and their advantages may be understood by referring to FIGS. 1-4, wherein like reference numerals refer to like elements.

Figure 2:
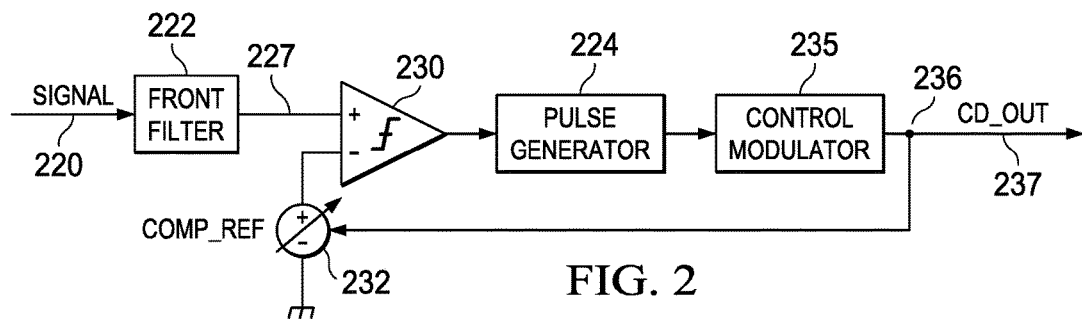
FIG. 2 is a functional view of the carrier detector, according to an embodiment of the present disclosure.

FIG. 2 shows an architecture, wherein the simple latch of FIG. 1 is replaced with a pulse timer and reference control module implementing functionality including that of a deglitch circuit. Signal 220 passes into front filter 222, and from the front filter output 227 to comparator 230. Comparator 230 has a comparator reference 232. The comparator output is fed to pulse generator 224, and then from pulse generator 224 into a pulse timer and reference control module 235. The output of the pulse timer and reference control module 235 passes as system output to CD_OUT 236, and also provides feedback to the comparator reference 232. The pulse timer and reference control module 235 appears in the position of the latch 217 in the prior art.

In the present disclosure, the weakness resulting from the discontinuous derivative at the data transition causing a fluctuation of the amplitude level at front filter output, may be overcome by a small digital circuit and feedback architecture, to establish a small and seamless carrier detector.

The pulse timer and reference control module 235 has a tolerance for a false detection, which generally may happen when the frequency shifts from lower to higher and the input amplitude level does not reach the detectable level. Pulse timer and reference control module 235 serves as an edge detector, timer and finite state machine.

At this transition, the amplitude level at the filter output becomes higher due to the transient response of the filter and eventually this would trigger the comparator for only one baud period. The de-glitch functionality of control module 235, however, ignores this clock edge.

In determining "Mark" and "Space" frequencies, at least a couple of methods may be used. With a known clock frequency, the number of clock periods can be counted from the reference clock in between known events such as zero crossings. Alternatively, events, such as zero crossings, in between clock periods may be counted. The latter method is inherently less accurate as it provides more quantization errors, especially as clock frequency increases.

Figure 2A:
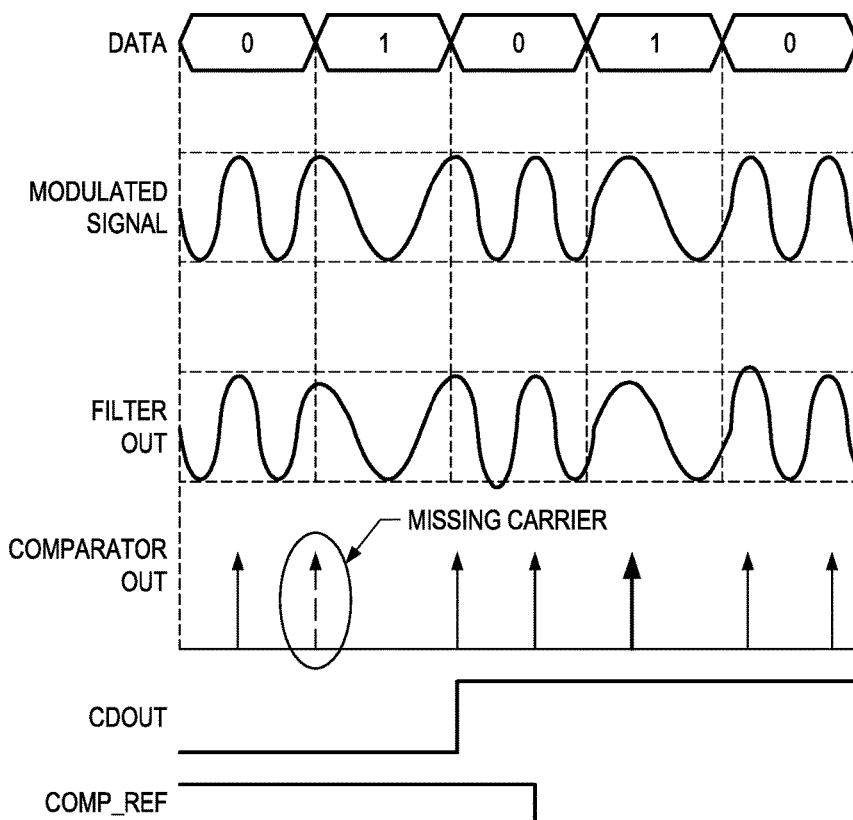
FIG. 2A illustrates a timing diagram for the carrier detector of FIG. 2.

FIG. 2A illustrates a timing diagram for the carrier detector of FIG. 2.

With reference to FIG. 2 and FIG. 2A, in an embodiment, the pulse timer and reference control module 235 sets a timer to last for 1.5 baud periods in connection with detecting a toggled pulse output transition (representing detection of a carrier) at the output of comparator 230. Pulse timer and reference control module 235 outputs a logic high (H) when two toggled signals arrive within the 1.5 baud period. The output from pulse timer and reference control module 235 toggles a comparator reference level to drop the comparator reference threshold in connection with receiving the two toggled signals. For instance, the reference level may initially be set at, for instance 120 milivolts (mV). In connection with detecting two toggled signals within the 1.5 baud periods, the threshold reference of comparator reference 232 is set to a lower threshold such as 80 milivolts. This helps ensure detection of "marks" by the carrier detector. Pulse timer and reference control module 235 sets a new timer to cause the output to remain high for 2 baud periods should a toggled signal not occur within that 2 baud period. After the expiration of the timer for the 2 baud period in connection with not receiving a toggled signal within that 2 baud period, the comparator reference threshold is returned from the lowered threshold, for instance, 80 mV, to the higher comparator level voltage such as 120 mV. The foregoing procedure is repeated to properly set up the carrier detect in conjunction with properly detecting signal levels for the carrier detector herein.

As a result of the pulse timer and reference control module, the carrier detector might delay the output or miss the beginning of signals. However, most communication protocols permit missing the first few bits of the preamble without losing the signal data, so in most cases, this does not create a problem.

The architecture disclosed herein has a feedback path to a comparator reference. Once the CD_OUT becomes logic high, the reference of the comparator can be set to as low a level as required for the carrier detector not to be disturbed by the transient response of the filter or the injected noise into the modulated signal. In this way, the carrier detector can maintain High as a stable signal during the demodulation process.

Figure 3:
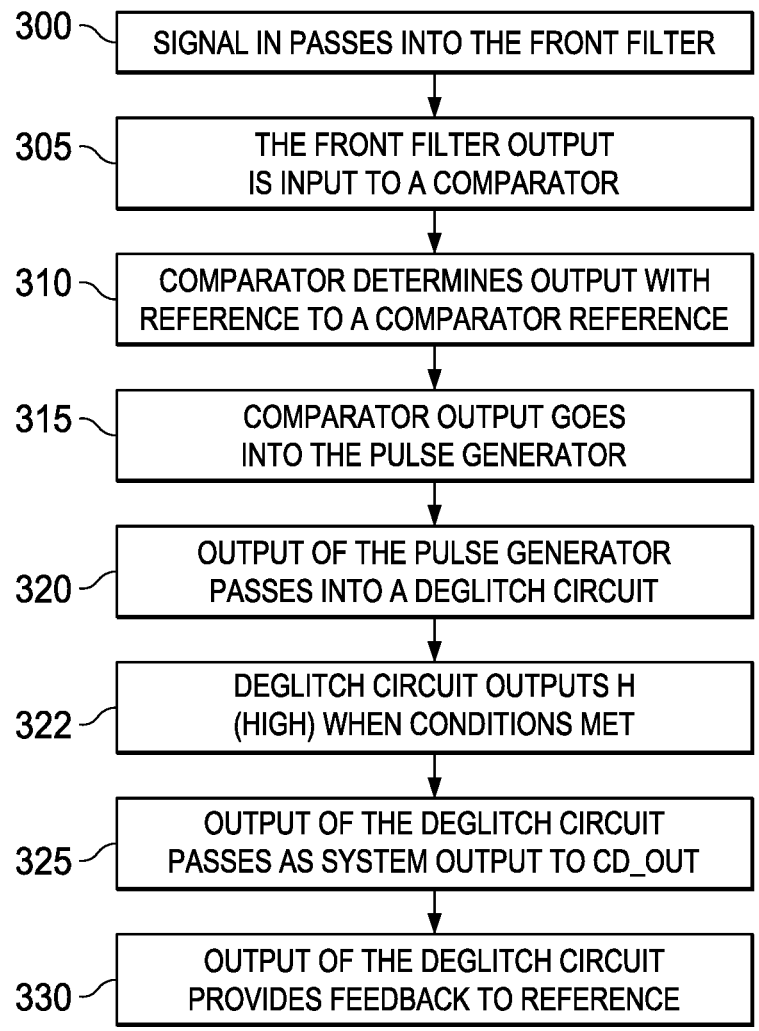
FIG. 3 is a flowchart of a process of operating a carrier detector, according to an embodiment of the present disclosure.

FIG. 3 illustrates an embodiment of a process of operating a carrier detector in an embodiment. In step 300, the signal in 220 passes into the front filter 222. In step 305, the front filter output 227 is input to a comparator 230. In step 310, the comparator 30 determines an output with reference to a comparator reference 32. In step 315, the comparator output goes into the pulse generator 224, and in step 320 the output of the pulse generator passes into pulse timer and reference control module 235. In step 322, the pulse timer and reference control module 235 outputs H (high) when 2 toggled signals come within 1.5 baud periods and keeps outputting H until a time out of 2 baud periods during which time no toggled output from comparator 230 is detected for 2 baud periods. The output of pulse timer and reference control module 235 passes as system output to CD_OUT 36 in step 325, and also provides feedback to the comparator reference 232 in step 330 which controls the reference level of comparator 230.

The architecture disclosed herein has a feedback path to a comparator reference. Once the CD_OUT becomes High, in step 135 the reference of the comparator can be set to as low a level as required to prevent the carrier detector from being disturbed by the transient response of the filter or the injected noise into the modulated signal. In this way, the carrier detector can maintain High as a stable signal during the demodulation process.

The present disclosure is based on amplitude detection architecture instead of standard energy detection. By applying a post digital processing and feedback path to a comparator reference, the issue of the accuracy can be resolved. By adding a post digital de-glitch filter and a feedback path from CD output signal to an analog comparator into a traditional carrier detector, the carrier detector can resolve an issue of amplitude fluctuation generated by the FSK based signal.

Compared with standard energy detection, the implementation area of the present embodiments is smaller, and the proposed approach allows more accurate detection without a large guard band as compared with conventional amplitude detection.

Figure 4:
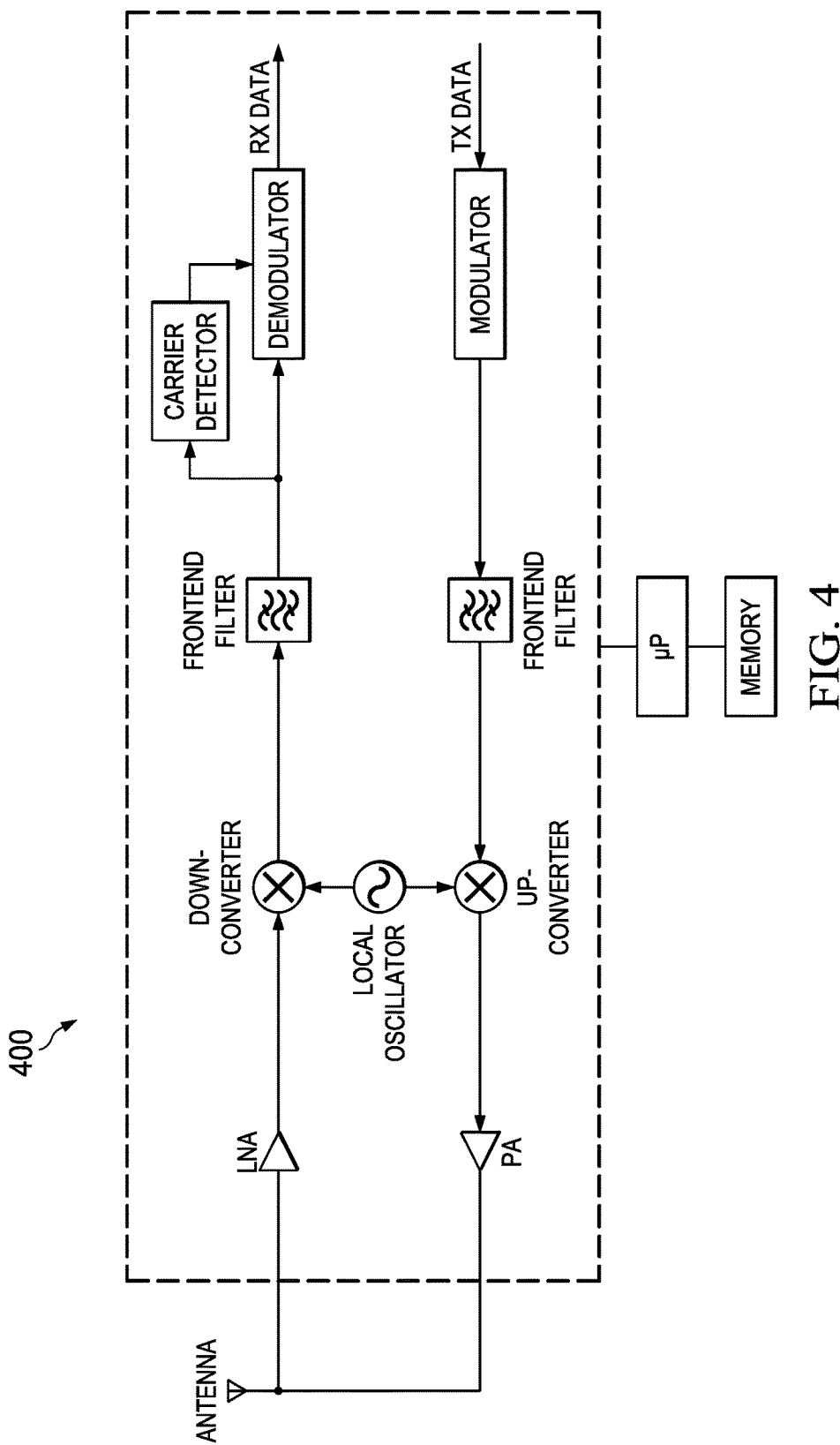
FIG. 4 shows a general architecture of wireless communication transceiver.

FIG. 4 shows a general architecture of a wireless communication transceiver, including the carrier detector as described herein, within communications unit 400 which is under the control of microprocessor μP connected to memory Mem (which among other things, holds instructions for Microprocessor μP). PA represents a power amplifier and LNA represents a low noise amplifier. A signal coming through an antenna, which may be representative of a power supply line, is filtered by low noise amplifier LNA. Next, the signal is down-converted and sent though a front-end filter. After, the signal progresses to the carrier detector, the carrier detector senses whether a valid signal comes to the demodulator. The demodulator operates to transfer a receive signal (RX). Thus, the carrier detector, as described herein, prevents garbage data from transferring into a core and accidentally demodulating a noise level signal. Data for transmission (TX) follows a path through a modulator and then through a front-end filter. Next the signal is up-converted and sent to a power amplifier PA for transmission by the antenna.

The system of the embodiments presented or portions of the system thereof may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement some embodiments may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device ("PLD") such as a Field-Programmable Gate Array ("FPGA"), Programmable Logic Array ("PLA"), or Programmable Array Logic ("PAL"), or any other device or arrangement of devices that is capable of implementing the steps of the processes described The processing machine used to implement the foregoing may utilize a suitable operating system. Thus, embodiments herein may include a processing machine running the iOS operating system, the OS X operating system, the Android operating system, the Microsoft Windows™ 10 operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the various Apple iphone and MacOS operating systems, the Apache operating system, an OpenStep™ operating system or another operating system or platform.

Further, various technologies may be used to provide communication between the various processors and/or memories, as well as to allow the processors and/or the memories to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the the foregoing. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the foregoing may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the foregoing illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the foregoing. Rather, any number of different programming languages may be utilized as is necessary and/or desirable.

Also, the instructions and/or data used in the practice of the embodiments may utilize any compression or encryption technique or algorithm, as may be desired. An encryption module might be used to encrypt data. Further, files or other data may be decrypted using a suitable decryption module, for example.

As described above, some embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by processors.

Further, the memory or memories used in the processing machine that implement the foregoing may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

The foregoing has been described herein using specific embodiments for the purposes of illustration only. It will be readily apparent to one of ordinary skill in the art, however, that the principles of the invention can be embodied in other ways. Therefore, the foregoing should not be regarded as being limited in scope to the specific embodiments disclosed herein, but instead as being fully commensurate in scope with the following claims.

We claim:

1. A method for carrier detection comprising:
providing modulated data according to frequency shift keying (FSK) to an input of a filter;
setting a reference level of a comparator to a first reference level;
comparing an amplitude level for the modulated data, using the comparator, against the first reference level;
generating a pulse response in connection with the amplitude level of the modulated data being equal to or greater than the first reference level, the pulse response being reflective of the existence of a data carrier;
setting a first timer for a first predetermined period of time in connection with detection of a predetermined number of pulse responses;
lowering the reference level for the comparator to a second reference level in connection with the detection of the predetermined number of pulse responses within the first predetermined period of time;
comparing the modulated data, using the comparator, against the second reference level; and
returning the reference level for the comparator to the first reference level for a second predetermined period of time when an absence of the data carrier is detected.

2. The method for carrier detection as recited in claim 1 wherein the first predetermined time period is 1.5 baud periods.

3. The method of carrier detection as recited in claim 1 wherein the second predetermined time period is 2 baud periods.

4. The method of carrier detection as recited in claim 1 wherein the predetermined number of pulse responses is two.

5. The method of carrier detection as recited in claim 1 wherein the modulated data comprises digital frequency information transmitted at approximately 1200 Hz and approximately 2200 Hz.

6. A carrier detector comprising:
a filter;
the filter having a signal input and a filter output;
a comparator having a first input and a second input, the first input of the comparator connected to the filter output;
a pulse timer and reference control module having an input and an output, the pulse timer and reference control module input being coupled to the output of the comparator, said pulse timer and reference control module including an edge detector, a timer, and a finite state machine; the pulse timer and reference control module output being connected to the second input of the comparator.

7. A carrier detector as recited in claim 6 wherein the comparator output is coupled to the pulse timer and reference control module through a pulse generator.

8. A computer-readable, non-transitory programmable product, for use in conjunction with a carrier detector comprising code for causing a processor to:
provide modulated data according to frequency shift keying (FSK) to an input of a filter;
set a reference level of a comparator to a first reference level;
compare an amplitude level for the modulated data, using the comparator, against the first reference level;
generate a pulse response in connection with the amplitude level of the modulated data being equal to or greater than the first reference level; the pulse response being reflective of the existence of a data carrier;
set a first timer for a first predetermined period of time in connection with detection of a predetermined number of pulse responses;
lower the reference level for the comparator to a second reference level in connection with the detection of the predetermined number of pulse responses within the first predetermined period of time; and
compare the modulated data, using the comparator, against the second reference level.

9. A computer-readable, non-transitory programmable product as recited in claim 8 further comprising:
code for causing the processor to return the reference level for the comparator to the first reference level for a second predetermined period of time when an absence of the data carrier is detected.

10. A computer-readable, non-transitory programmable product as recited in claim 8 wherein the first predetermined time period is 1.5 baud periods.

11. A computer-readable, non-transitory programmable product as recited in claim 9 wherein the second predetermined time period is 2 baud periods.

12. A computer-readable, non-transitory programmable product as recited in claim 8 wherein the modulated data comprises digital frequency information transmitted at approximately 1200 Hz and approximately 2200 Hz.

13. A computer-readable, non-transitory programmable product as recited in claim 8 wherein the predetermined number of pulse responses is two.

14. A computer-readable, non-transitory programmable product as recited in claim 9 wherein the first predetermined time period is 1.5 baud periods, wherein the second predetermined time period is 2 baud periods and wherein the predetermined number of pulse responses is two.

15. A computer-readable, non-transitory programmable product as recited in claim 9 wherein the first predetermined time period is 1.5 baud periods, wherein the second predetermined time period is 2 baud periods, wherein the modulated data comprises digital frequency information transmitted at approximately 1200 Hz and approximately 2200 Hz and wherein the predetermined number of pulse responses is two.

* * * * *